US012252204B2

(12) United States Patent
Hirano et al.

(10) Patent No.: US 12,252,204 B2
(45) Date of Patent: Mar. 18, 2025

(54) RADIATOR SUPPORT ARRANGEMENT FOR A SADDLE-RIDE VEHICLE

(71) Applicant: HONDA MOTOR CO., LTD., Tokyo (JP)

(72) Inventors: Kohei Hirano, Tokyo (JP); Shun Niijima, Tokyo (JP); Takazumi Hayashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 360 days.

(21) Appl. No.: 17/696,111

(22) Filed: Mar. 16, 2022

(65) Prior Publication Data
US 2022/0315154 A1 Oct. 6, 2022

(30) Foreign Application Priority Data

Mar. 31, 2021 (JP) ................. 2021-062185

(51) Int. Cl.
| | |
|---|---|
| *B62K 11/00* | (2006.01) |
| *B62J 17/02* | (2006.01) |
| *B62J 41/00* | (2020.01) |
| *B62K 11/04* | (2006.01) |
| *B62J 11/00* | (2020.01) |
| *B62J 17/10* | (2020.01) |

(52) U.S. Cl.
CPC ............. *B62J 41/00* (2020.02); *B62J 17/02* (2013.01); *B62K 11/04* (2013.01); *B62J 11/00* (2013.01); *B62J 17/10* (2020.02)

(58) Field of Classification Search
CPC .. B60K 11/04; B62J 41/00; B62J 11/00; B62J 17/10
See application file for complete search history.

(56) References Cited

U.S. PATENT DOCUMENTS

| | | | |
|---|---|---|---|
| 9,358,875 B2 | 6/2016 | Hosoya et al. | |
| 2003/0062456 A1 | 4/2003 | Nakagawa et al. | |
| 2005/0039719 A1* | 2/2005 | Moss ....................... | F01M 1/12 123/196 AB |
| 2010/0078242 A1* | 4/2010 | Suzuki ................... | B62K 11/06 180/68.6 |
| 2010/0187033 A1 | 7/2010 | Hayashi et al. | |

(Continued)

FOREIGN PATENT DOCUMENTS

| | | |
|---|---|---|
| DE | 102 44 971 A1 | 4/2003 |
| DE | 10 2020 204 178 A1 | 10/2020 |
| JP | H06-74731 B2 | 9/1994 |

(Continued)

OTHER PUBLICATIONS

German Office Action dated Nov. 14, 2023, German Application No. 10 2022 106 763.7, 5 pages.

(Continued)

*Primary Examiner* — Jason D Shanske
*Assistant Examiner* — James J Triggs
(74) *Attorney, Agent, or Firm* — Rankin, Hill & Clark LLP

(57) ABSTRACT

A saddle-ride vehicle is a saddle-ride vehicle in which a radiator is disposed in front of a down tube hanging down from a head pipe, the saddle-ride vehicle including: a radiator shroud provided at the radiator, the radiator being supported only by the radiator shroud, the radiator being supported by a vehicle body via the radiator shroud.

6 Claims, 10 Drawing Sheets

(56) References Cited

U.S. PATENT DOCUMENTS

2020/0324846 A1   10/2020   Yamamoto et al.

FOREIGN PATENT DOCUMENTS

| JP | 2008-013149 | | 1/2008 |
|----|-------------|---|--------|
| JP | 2017-140933 | A | 8/2017 |
| JP | 2017-141678 | A | 8/2017 |

OTHER PUBLICATIONS

Indian Office Action dated Oct. 11, 2022 issued in corresponding Indian application No. 202214016216; English translation included (8 pages).

* cited by examiner

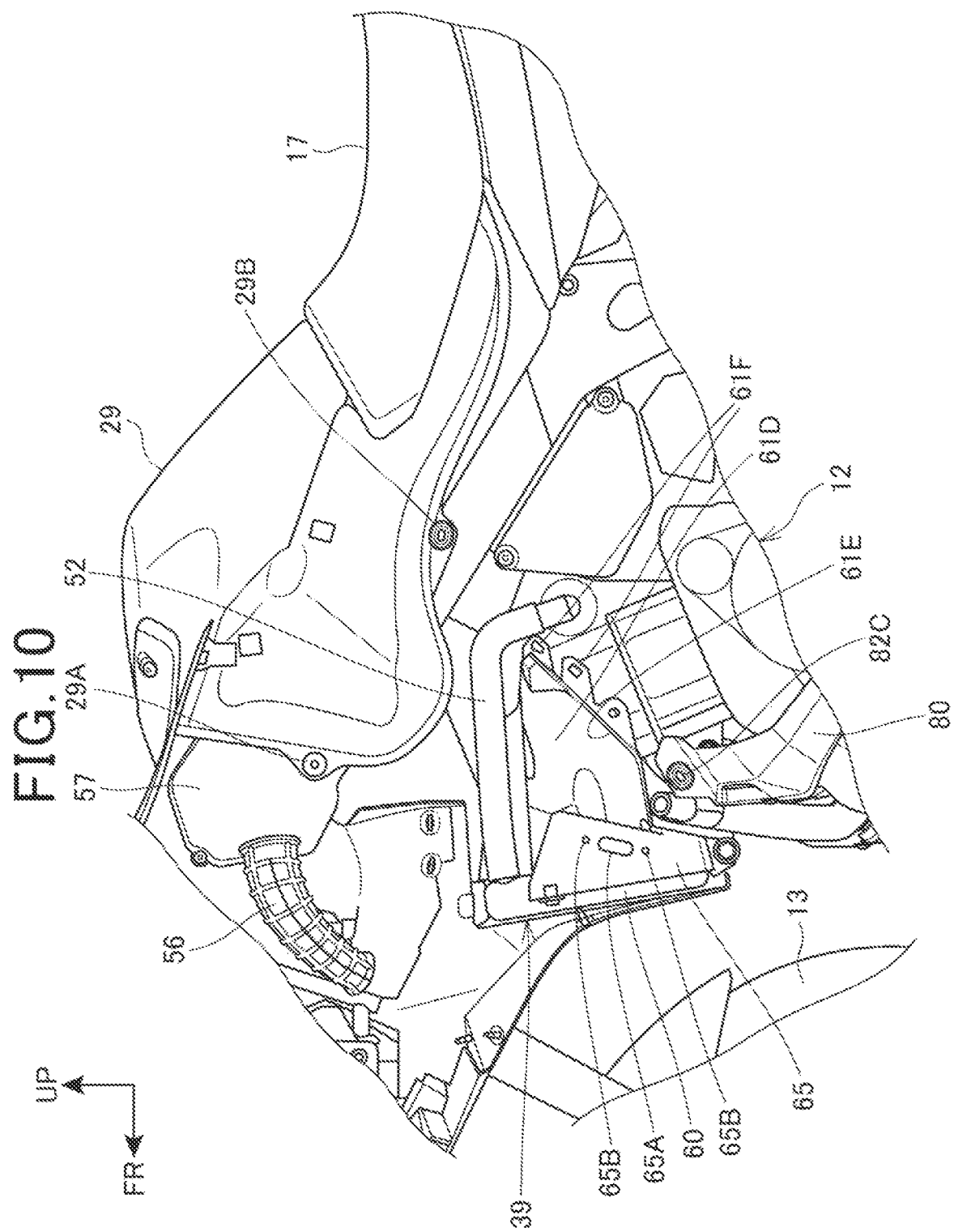

RADIATOR SUPPORT ARRANGEMENT FOR A SADDLE-RIDE VEHICLE

INCORPORATION BY REFERENCE

The present application claims priority under 35 U.S.C. § 119 to Japanese Patent Application No. 2021-062185 filed on Mar. 31, 2021. The content of the application is incorporated herein by reference in its entirety.

BACKGROUND OF THE INVENTION

Field of the Invention

The present invention relates to a saddle-ride vehicle.

Description of the Related Art

In the related art, disposing a radiator in front of a pair of down tubes and fastening the radiator to the down tubes thereby to secure the radiator in a saddle-ride vehicle is known (see Japanese Patent Laid-Open No. 2008-013149, for example).

According to Japanese Patent Laid-Open No. 2008-013149, the pair of down tubes are provided, and it is thus possible to support the radiator at positions with a distance in a vehicle width direction and to secure the radiator to a frame with rigidity. However, attachment positions on the side of the radiator are determined in advance in many cases, and it may be necessary to increase the distance in the vehicle width direction by increasing sizes of brackets extending from the frame in order to obtain rigidity corresponding to the radiator side depending on a frame form of the saddle-ride vehicle.

The present invention was made in view of the aforementioned circumstances, and an object thereof is to provide a saddle-ride vehicle capable of supporting a radiator at a position at which rigidity is easily achieved regardless of a frame form and capable of improving a degree of freedom in attachment of the radiator.

SUMMARY OF THE INVENTION

There is provided a saddle-ride vehicle which is a saddle-ride vehicle in which a radiator is disposed in front of a down tube hanging down from a head pipe, the saddle-ride vehicle including: a radiator shroud provided at the radiator, the radiator being supported only by the radiator shroud, the radiator being supported by a vehicle body via the radiator shroud.

It is possible to support the radiator at a position at which rigidity is easily achieved regardless of a frame form and to improve a degree of freedom in attachment of the radiator.

BRIEF DESCRIPTION OF THE DRAWINGS

FIG. 10 is a diagram in which illustration of side covers is omitted from FIG. 9.

DETAILED DESCRIPTION OF THE PREFERRED EMBODIMENT

Figure 1:
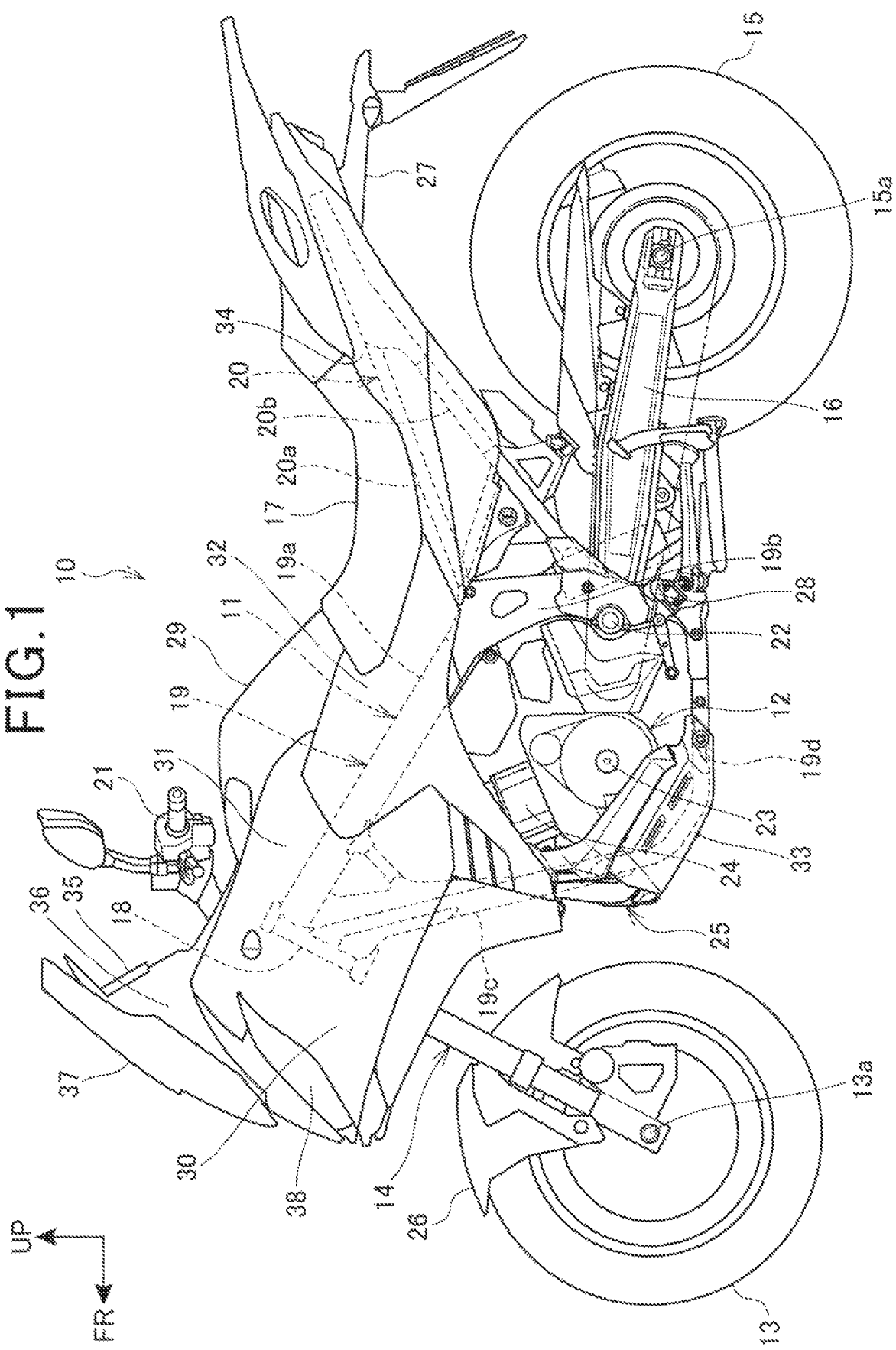
FIG. 1 is a side view of a saddle-ride vehicle according to an embodiment of the invention.

An embodiment of the present invention will be described below with reference to the drawings. Unless otherwise mentioned, directions including front-rear, left-right, and up-down mentioned in the description are the same as those directions relative to a vehicle body. Reference signs FR, UP, and LH shown in the drawings indicate a vehicle body front side, a vehicle body upper side, and a vehicle body left side, respectively.

Embodiment

FIG. 1 is a side view of a saddle-ride vehicle 10 according to an embodiment of the present invention.

The saddle-ride vehicle 10 is a vehicle including a vehicle body frame 11, a power unit 12 supported on the vehicle body frame 11, a front fork 14 that supports a front wheel 13 in a steerable manner, a swing arm 16 that supports a rear wheel 15, and a seat 17 for a rider.

The saddle-ride vehicle 10 is a vehicle on which the rider sits astride the seat 17. The seat 17 is provided above a rear part of the vehicle body frame 11.

The vehicle body frame 11 includes a head pipe 18 provided at a front end portion of the vehicle body frame 11, a front frame 19 located on a rear side of the head pipe 18, and a rear frame 20 located on a rear side of the front frame 19. A front end portion of the front frame 19 is connected to the head pipe 18.

The seat 17 is supported on the rear frame 20.

The front fork 14 is supported on the head pipe 18 in such a manner that it can be steered left and right. The front wheel 13 is supported on an axle 13a provided at a lower end portion of the front fork 14. A handle 21 for steering that the rider grasps is mounted at an upper end portion of the front fork 14.

The swing arm 16 is supported on a pivot shaft 22 that is supported on the vehicle body frame 11. The pivot shaft 22 is a shaft extending horizontally in a vehicle width direction. The pivot shaft 22 is passed through a front end portion of the swing arm 16. The swing arm 16 swings up and down around the pivot shaft 22.

The rear wheel 15 is supported on an axle 15a provided at a rear end portion of the swing arm 16.

The power unit 12 is disposed between the front wheel 13 and the rear wheel 15 and supported on the vehicle body frame 11.

The power unit 12 is an internal combustion engine. The power unit 12 includes a crankcase 23 and a cylinder 24 that houses a reciprocating piston. An exhaust device 25 is connected to an exhaust port of the cylinder 24.

An output of the power unit 12 is transmitted to the rear wheel 15 through a drive power transmission member that connects the power unit 12 and the rear wheel 15 to each other.

The saddle-ride vehicle 10 further includes a front fender 26 that covers the front wheel 13 from above, a rear fender 27 that covers the rear wheel 15 from above, footrests 28 on which the rider places his or her feet, and a fuel tank 29 that stores fuel to be used by the power unit 12.

The front fender 26 is mounted on the front fork 14. The rear fender 27 and the footrests 28 are provided on a lower side relative to the seat 17. The fuel tank 29 is supported on the vehicle body frame 11.

In the present embodiment, the front frame 19 includes a pair of left and right main frames 19a extending on the rear lower side from the head pipe 18, pivot frames 19b extending on the lower side from rear end portions of the main frames 19a, a down frame 19c extending on the lower side from a position of the head pipe 18 below front ends of the main frames 19a, and a pair of left and right lower frames 19d extending on the rear lower side from a lower end of the down frame 19c, then extending on the rear side, and connected to the lower end portions of the pivot frames 19b.

The rear frame 20 includes a pair of left and right seat frames 20a extending upward on the rear side from upper portions of the left and right pivot frames 19b up to the vehicle rear end portion and a pair of left and right rear subframes 20b extending from intermediate portions of the left and right pivot frames 19b in the up-down direction up to rear end portions of the seat frames 20a.

Figure 2:
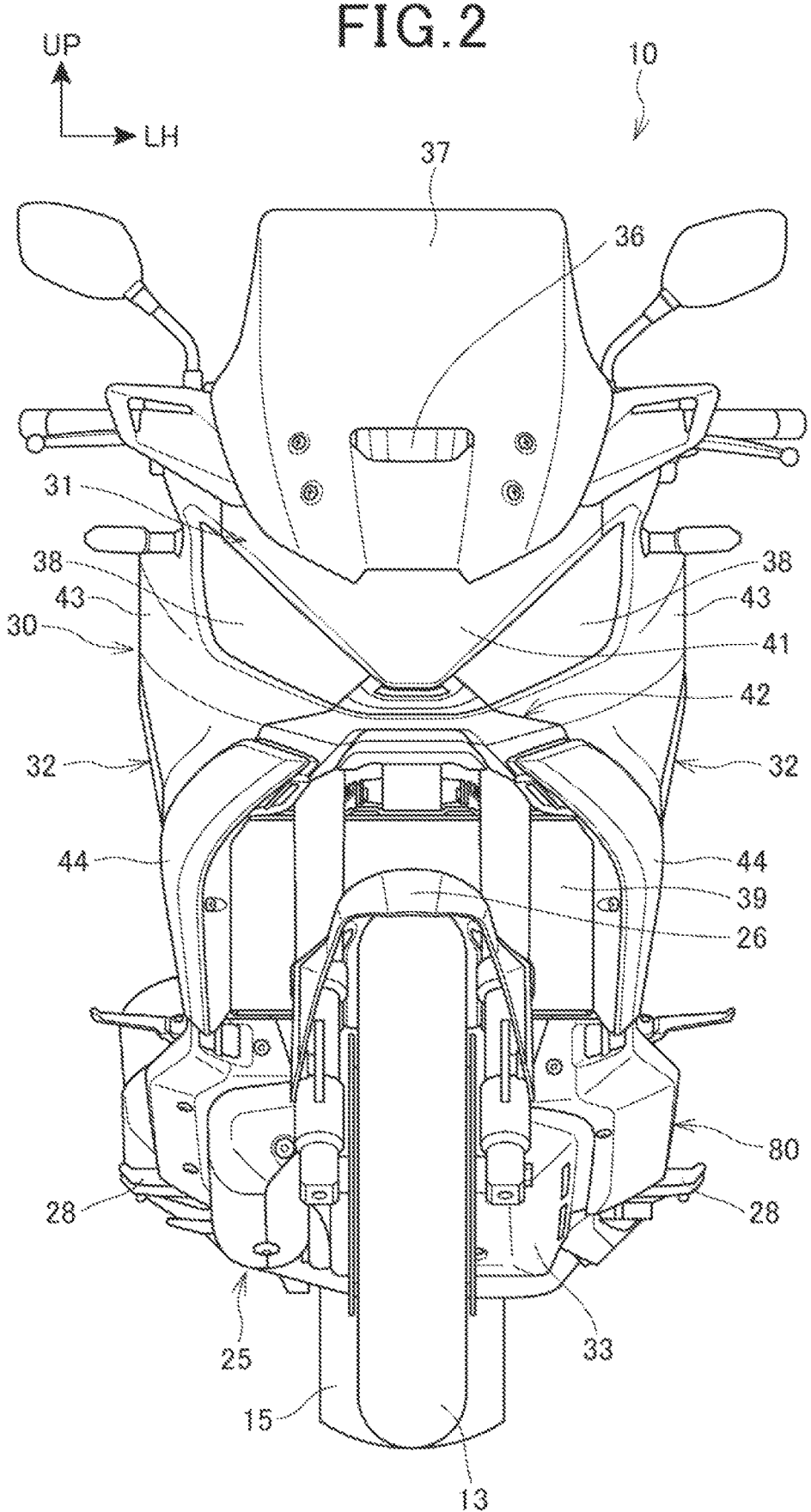
FIG. 2 is a front view of the saddle-ride vehicle according to the embodiment of the invention.

FIG. 2 is a front view of the saddle-ride vehicle 10 according to the embodiment of the invention.

As illustrated in FIGS. 1 and 2, the saddle-ride vehicle 10 includes a vehicle body cover 30 covering the vehicle body constituted by the vehicle body frame 11, the power unit 12, and the like.

The vehicle body cover 30 includes a front cowl 31 covering the head pipe 18 and an upper portion of the front fork 14 from the front side and left and right sides and a pair of left and right side covers 32 covering the side surfaces of the fuel tank 29 from outer sides behind the front cowl 31.

Also, the vehicle body cover 30 includes an undercover 33 covering the crankcase 23 from the lower side and a pair of left and right rear covers 34 covering the lower side of the seat 17 from both sides behind the side cover 32.

A meter visor 36 covering a meter 35 is provided at the upper portion of the front cowl 31. The meter visor 36 is provided with a wind screen 37 with a plate shape extending upward on the rear side.

The front cowl 31 is provided with a pair of left and right headlights 38. The radiator 39 is disposed in a space covered with the front cowl 31.

Figure 3:
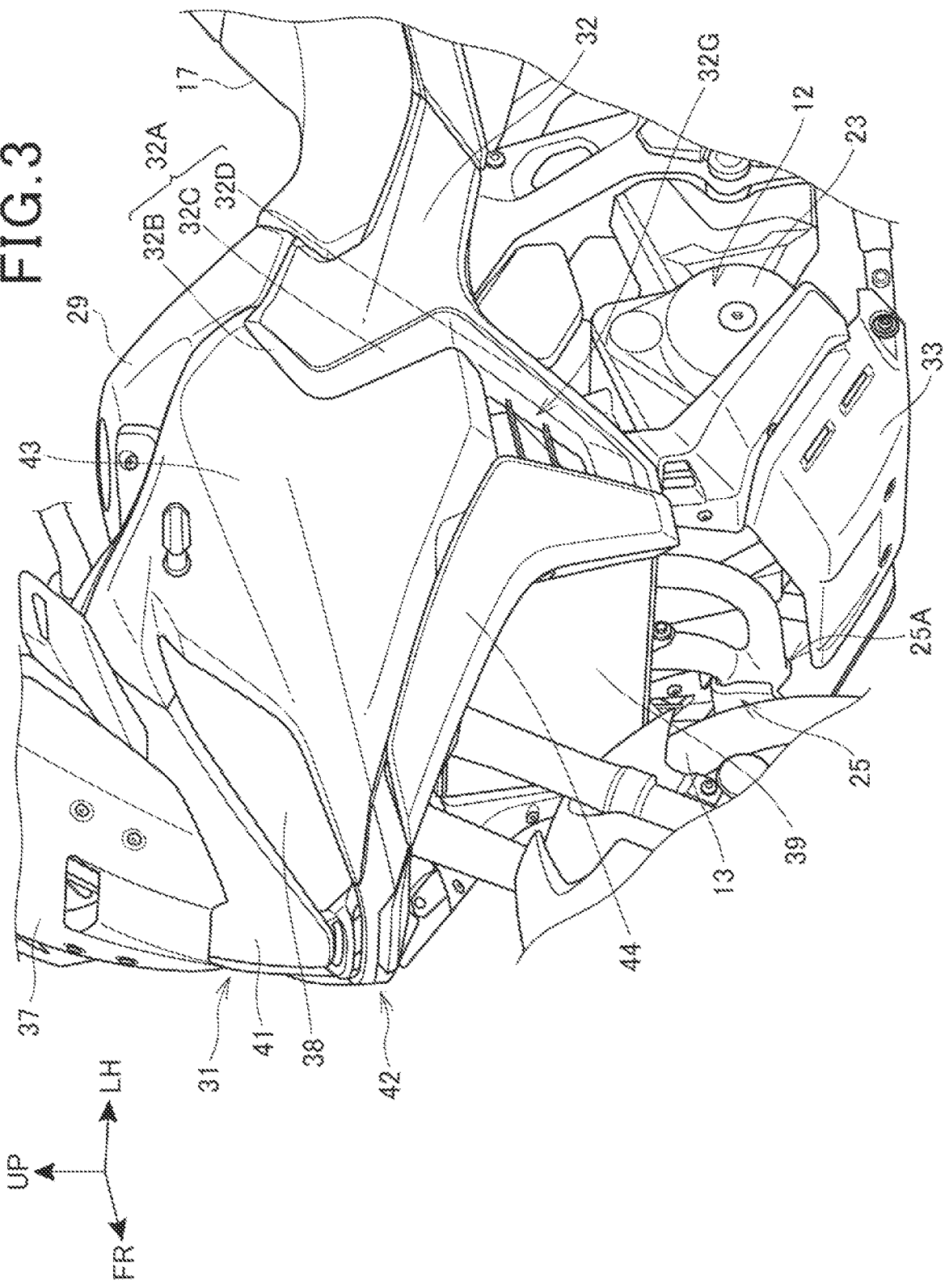
FIG. 3 is a perspective view of the saddle-ride vehicle from a left front side according to the embodiment of the invention.
Figure 4:
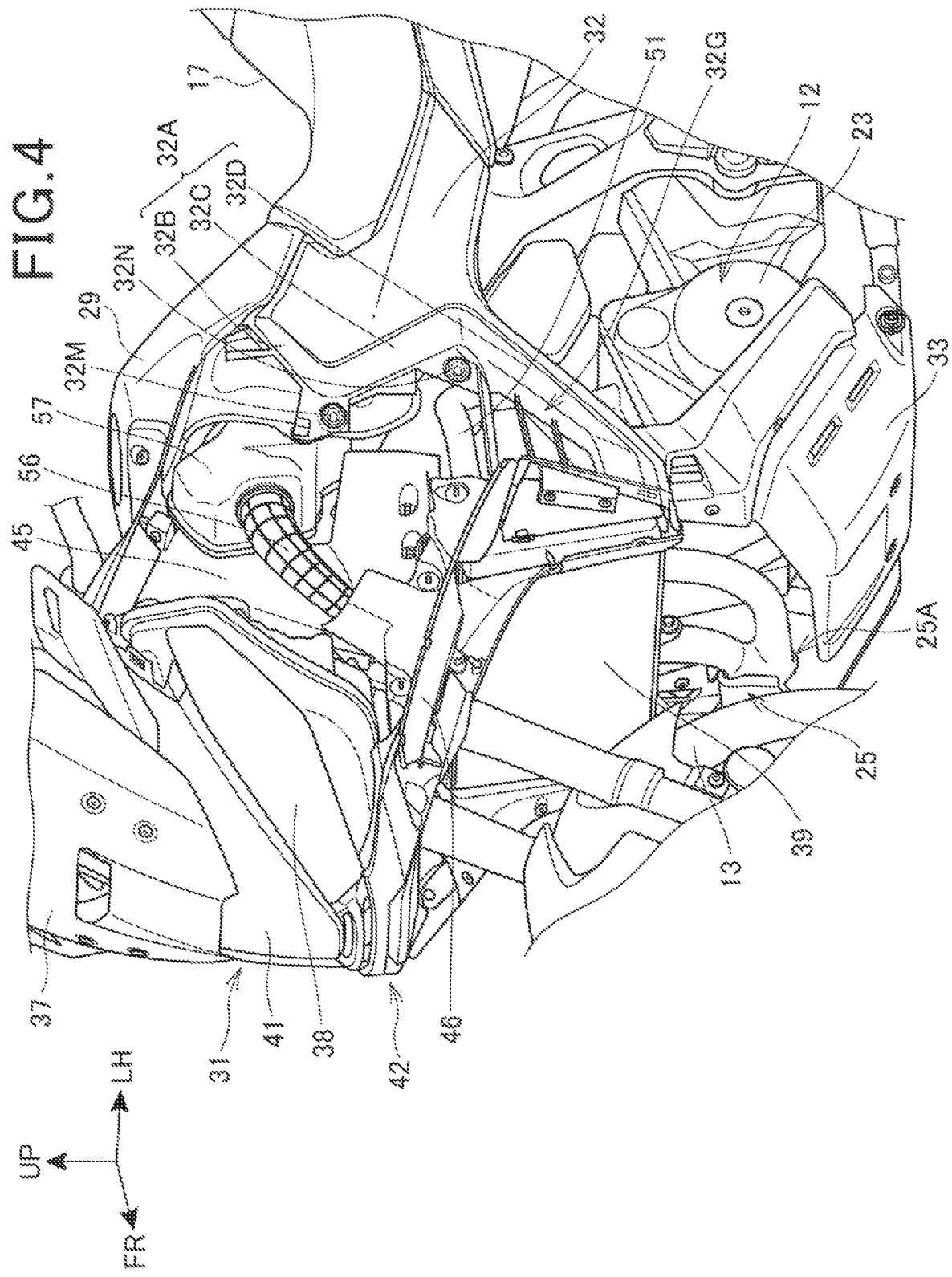
FIG. 4 is a diagram in which illustration of a front side cowl and a front lower cowl is omitted from FIG. 3.

FIG. 3 is a perspective view of the saddle-ride vehicle 10 from the left front side according to the embodiment of the invention. FIG. 4 is a diagram in which illustration of front side cowls 43 and front lower cowls 44 is omitted from FIG. 3.

The front cowls 31 incudes a front upper cowl 41 covering the upper side of the headlights 38, a front front-end cowl 42 covering the front end portion of the saddle-ride vehicle 10 below the headlights 38, and a pair of left and right front side cowls 43 extending on the rear side from the headlights 38, a pair of left and right front lower cowls 44 covering the lower side of the front side cowls 43, an inner cover 45 (see FIG. 4) covered with the front upper cowl 41, the front front-end cowl 42, the front side cowls 43, and the front lower cowls 44, and connection covers 46 (see FIG. 4) connecting the front front-end cowl 42 to the side covers 32 with the outer sides thereof covered with the front side cowls 43.

Figure 5:
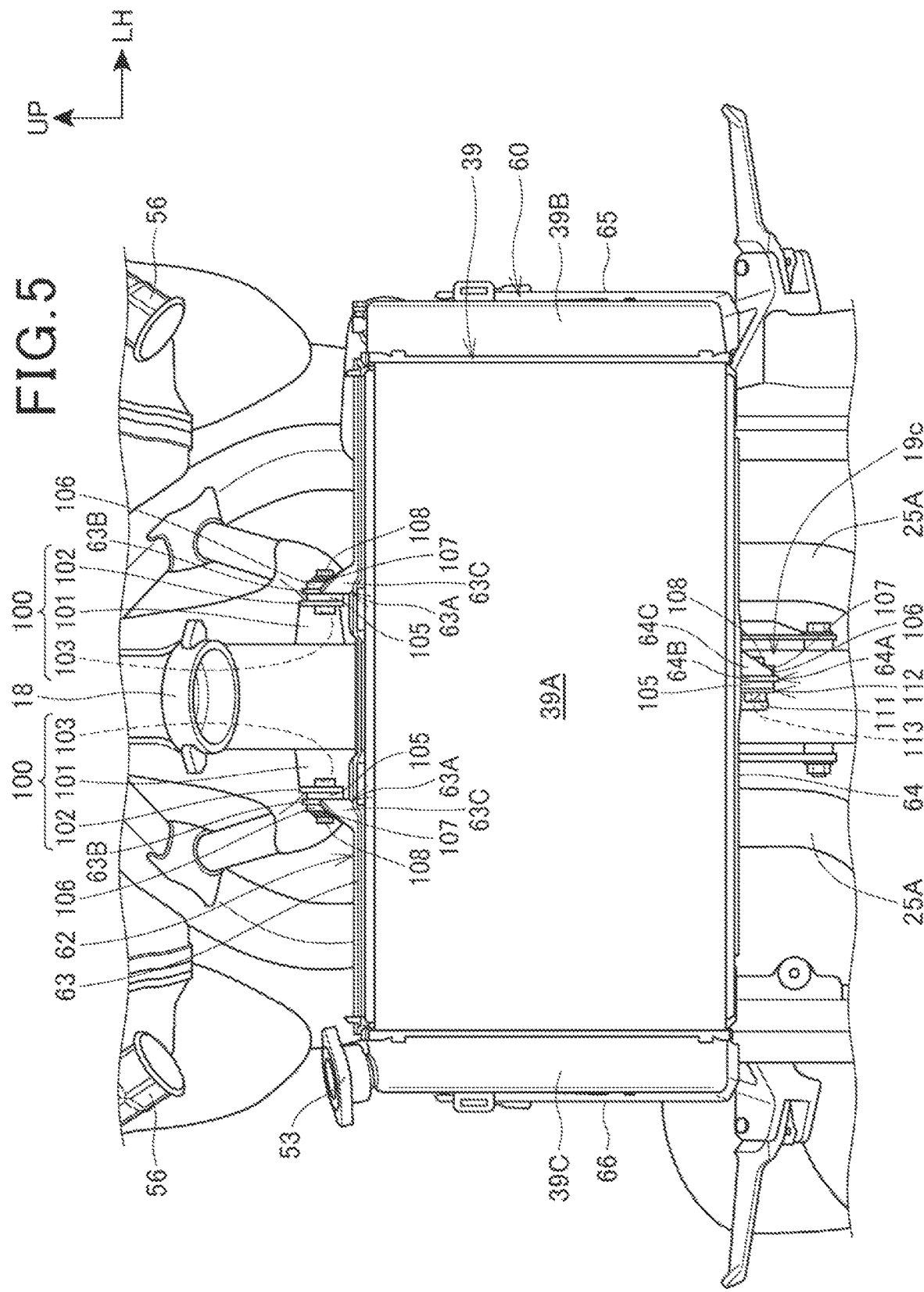
FIG. 5 is a front view illustrating a positional relationship of a radiator, a radiator shroud, and a down frame.

FIG. 5 is a front view illustrating a positional relationship of the radiator 39, the radiator shroud 60, and the down frame 19c.

The power unit 12 in the present embodiment is a water-cooled engine. Hereinafter, the power unit 12 will be referred to as an engine 12. The engine 12 is cooled with cooling water circulated between the engine 12 and the radiator 39.

The radiator 39 is formed into a plate shape extending in the vehicle width direction (left-right direction). In the present embodiment, the radiator 39 is formed into a rectangular plate shape. The radiator 39 is located between the side cover 32 (see FIG. 2) on the left side and the side cover 32 (see FIG. 2) on the right side. The radiator 39 is disposed in front of the down frame (down tube) 19c. The down frame 19c hangs down from the head pipe 18. The down frame 19c in the present embodiment hangs down slightly on the rear side from the head pipe 18. The down frame 19c is formed into a square-cylindrical shape with front, rear, left, and right surfaces.

The radiator 39 includes a core 39A with a rectangular shape extending in the vehicle width direction, a tank 39B on the left side provided on the left side of the core 39A, and a tank 39C on the right side provided on the right side of the core 39A.

The core 39A is formed into a plate shape including a plurality of tubes (not illustrated) that cause the tank 39B on the left side and the tank 39C on the right side to communicate each other and a plurality of fins (not illustrated) provided in the surroundings of the tubes (not illustrated).

Figure 6:
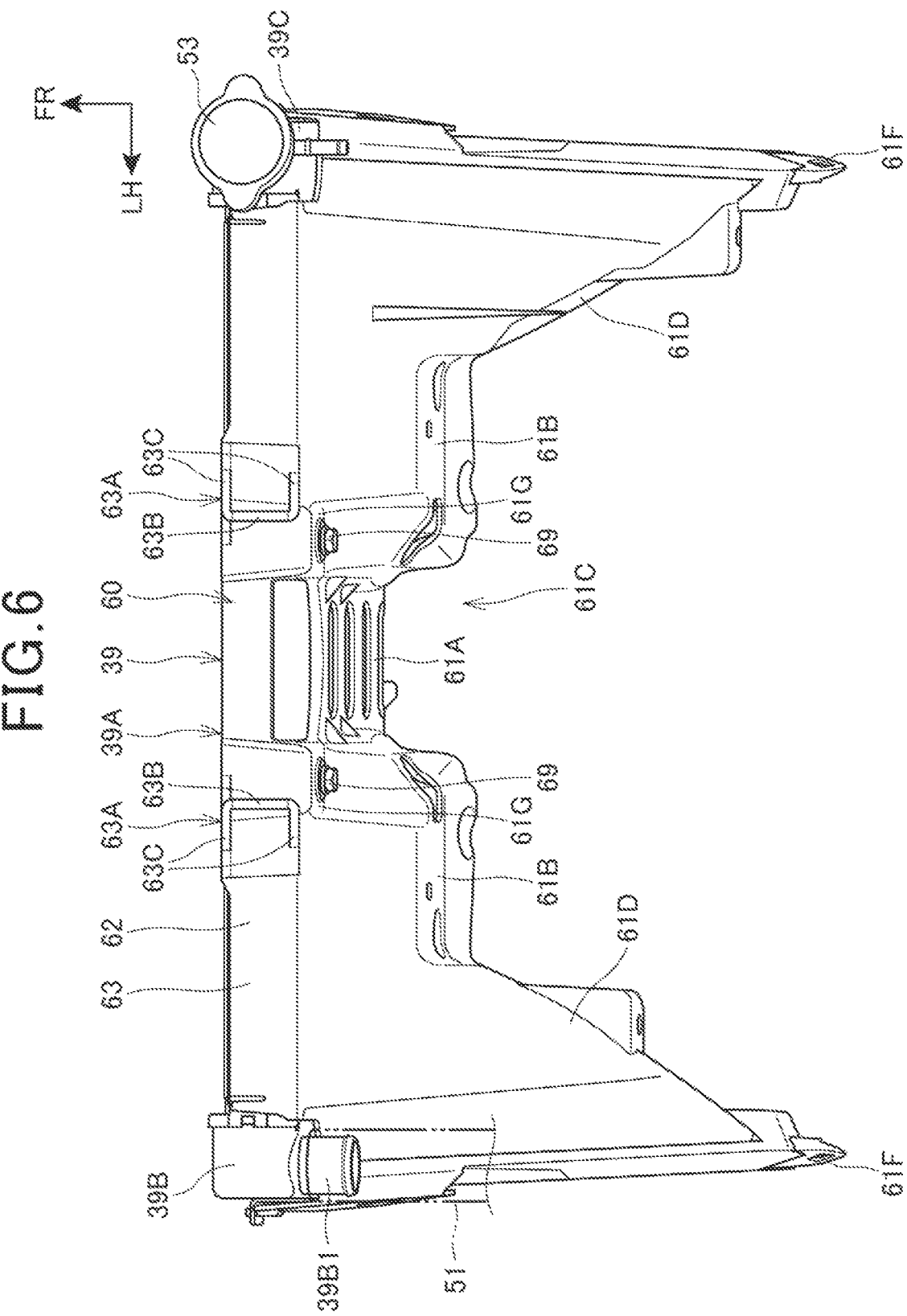
FIG. 6 is a plan view of the radiator and the radiator shroud.
Figure 7:
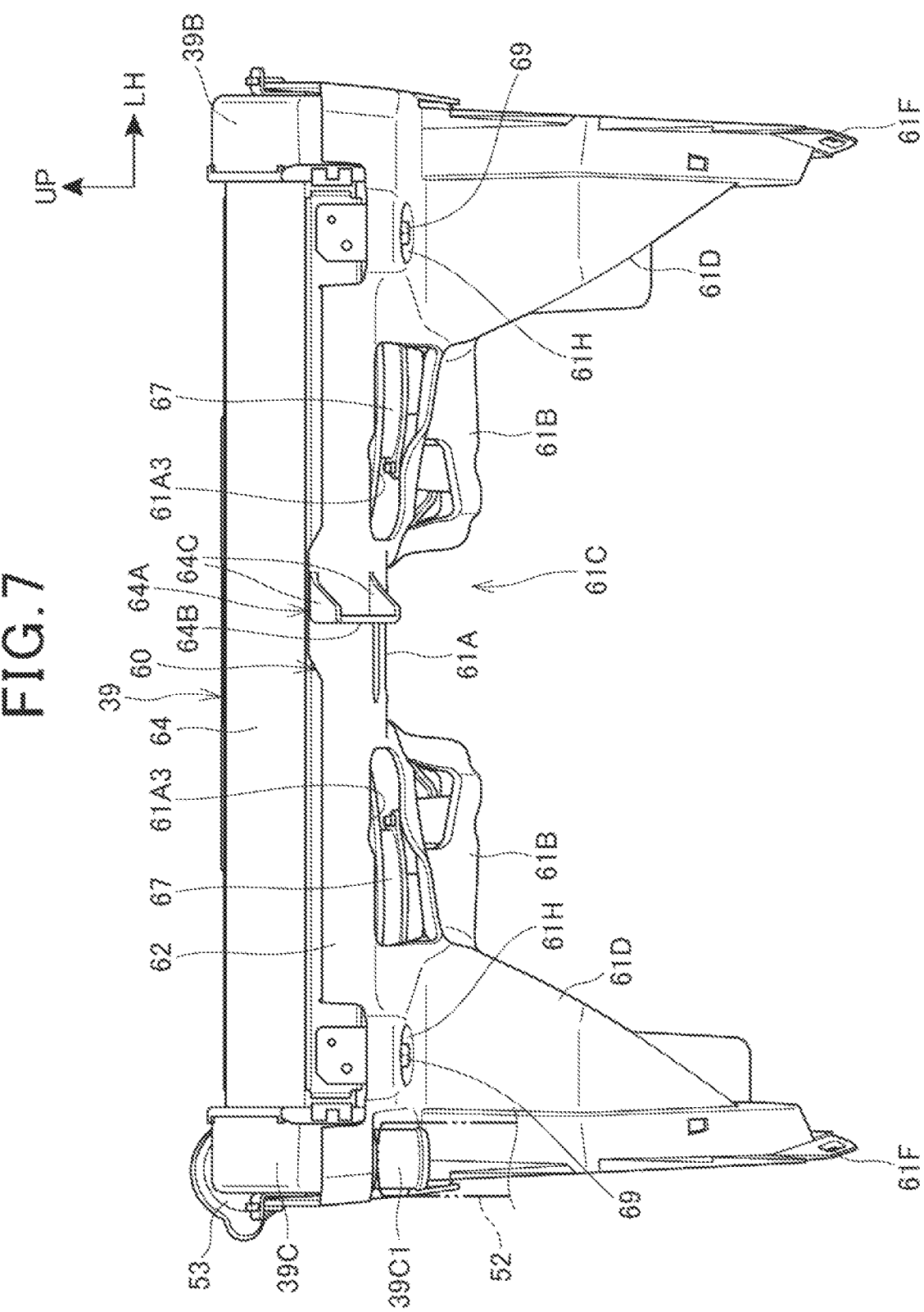
FIG. 7 is a bottom view of the radiator and the radiator shroud.

FIG. 6 is a plan view of the radiator 39 and the radiator shroud 60. FIG. 7 is a bottom view of the radiator 39 and the radiator shroud 60.

A hose connecting portion 39B1 (see FIG. 6) with a tubular shape projecting on the rear side is formed at an upper portion of the tank 39B on the left side illustrated in FIGS. 5 to 7. A radiator hose 51 is connected to the hose connecting portion 39B1. The radiator hose 51 is connected to a left side surface of the cylinder 24 (see FIG. 1) as illustrated in FIG. 4. Cooling water that has cooled the engine 12 flows into the radiator hose 51.

A tubular hose connecting portion 39C1 with a tubular shape projecting on the rear side is formed at a lower portion of the tank 39C on the right side. A radiator hose 52 is connected to the hose connecting portion 39C1. The radiator hose 52 is connected to a right side surface of the cylinder 24 (see FIG. 1). The radiator hose 52 is connected to the cylinder 24 beyond an exhaust pipe 25A (see FIG. 4) of the exhaust device 25.

A radiator cap 53 is provided at an upper portion of the tank 39C on the right side.

Note that the cooling water is pressure-fed by a water pump (not illustrated) provided at the crankcase 23 and is circulated between the engine 12 and the radiator 39. The cooling water with a temperature raised after cooling the engine 12 flows into the tank 39B on the left side through the radiator hose 51 and is cooled by running wind at the core 39A of the radiator 39. The cooling water cooled at the core 39A flows out of the tank 38C on the right side, is fed to the engine 12 through the radiator hose 52, cools the engine 12, is returned to the radiator 39, and repeats this circulation.

Figure 8:
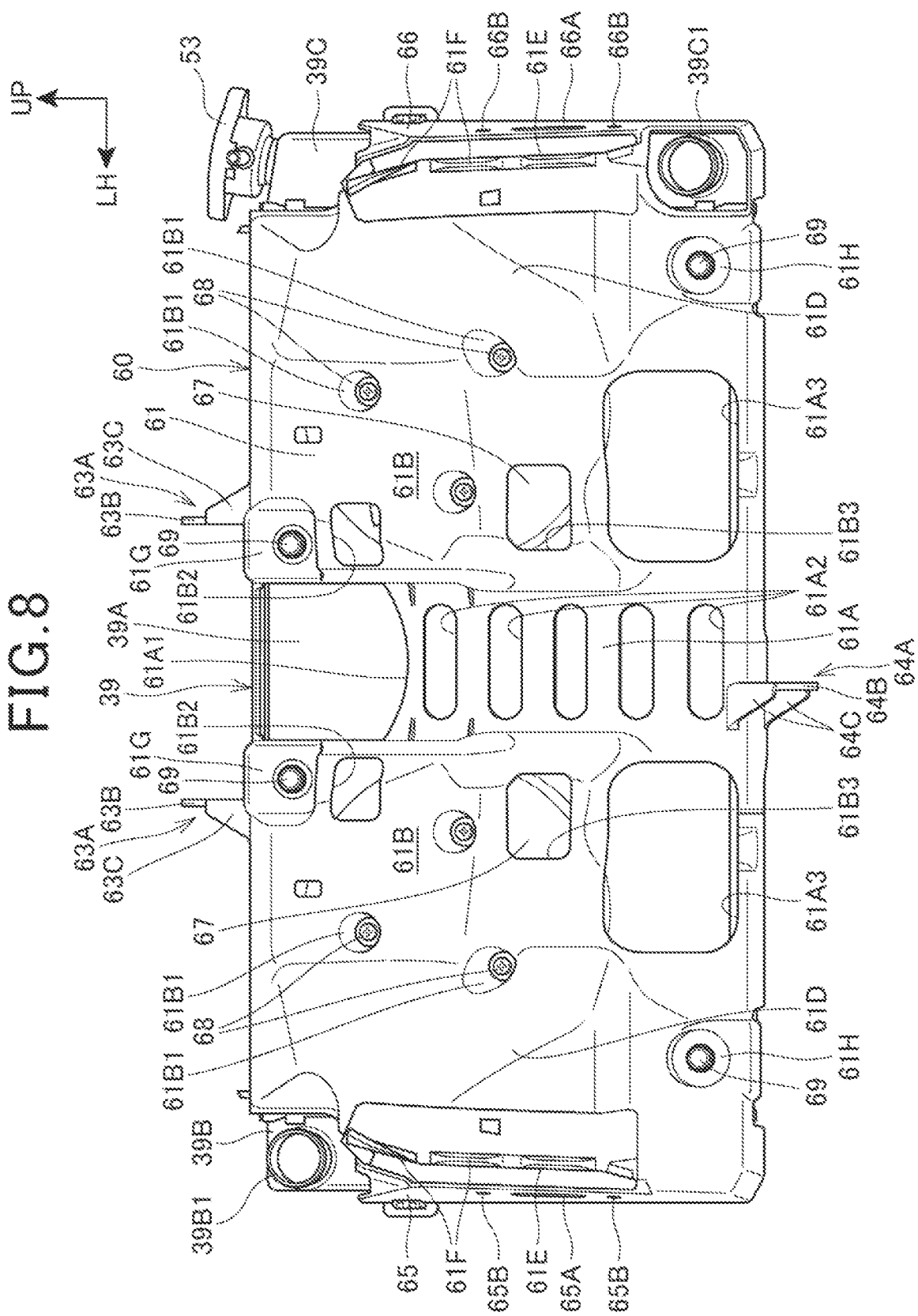
FIG. 8 is a rear view of the radiator and the radiator shroud.

FIG. 8 is a rear view of the radiator 39 and the radiator shroud 60.

The radiator 39 is supported by the down frame 19c via the radiator shroud 60. The radiator 39 is supported in a substantially horizontally symmetrical manner with respect to the down frame 19c. The radiator shroud 60 is a member located behind the core 39A of the radiator 39 and guiding wind discharged from the radiator 39.

The radiator shroud 60 includes a rear wall portion 61 covering the rear surface of the radiator 39. The rear wall portion 61 is formed into a rectangular shape extending in the vehicle width direction in a rear view in a manner corresponding to a rear surface shape of the radiator 39. An outer peripheral wall 62 (see FIG. 5) extending on the front side is formed at an outer periphery of the rear wall portion 61. The outer peripheral wall 62 includes an upper wall portion 63 covering the upper surface of the radiator 39, a lower wall portion 64 covering the lower surface of the radiator 39, a side wall portion 65 on the left side covering the left surface of the radiator 39, and a side wall portion 66 on the right side covering the right surface of the radiator 39.

In FIGS. 6 to 8, a frame proximal portion 61A is formed at the center of the rear wall portion 61 of the radiator shroud 60 in the vehicle width direction. Fan accommodating portions 61B expanding on the rear side are formed on both left and right sides of the frame proximal portion 61A. The fan accommodating portions 61B are formed with deviation on the upper side with respect to the entire rear wall portion 61 in the up-down direction. The fan accommodating portions 61B accommodates radiator fans 67. The radiator fans 67 are fastened to fastening portions 61B1 of the fan accommodating portions 61B with fastening members 68 extending in the front-rear direction. The fastening members 68 are, for example, bolts.

Wind discharge ports 61B2 and 61B3 penetrating in the thickness direction are formed on the inner side of the fan accommodating portions 61B in the vehicle width direction. The radiator fans 67 are exposed from the wind discharge ports 61B2 and 61B3 in a rear view. The fan accommodating portion 61B on the left side, the frame proximal portion 61A, and the fan accommodating portion 61B on the right side form a frame disposition space 61C with a form recessed on the front side. The down frame 19c is disposed in the frame disposition space 61C in a state in which the front surface is in the proximity of the frame proximal portion 61A and left and right side surfaces face the left and right fan accommodating portions 61B.

Discharged wind guide portions 61D extending on the rear side are formed on the outer sides of the fan accommodating portions 61B in the vehicle width direction. The discharged wind guide portions 61D overlap the radiator fans 67 in a rear view and are inclined on the rear side toward the outer sides in the vehicle width direction. Wind discharge ports 61E (see FIG. 8) opening on the outer sides in the vehicle width direction are formed at outer ends of the discharged wind guide portions 61D in the vehicle width direction. Harness holding portions 61F are formed at rear end portions of the discharged wind guide portions 61D. The harness holding portions 61F hold harnesses, which are not illustrated.

In FIG. 8, an opening 61A1 with a quadrangular shape is formed at an upper end portion of the frame proximal portion 61A. A plurality of openings 61A2 with long hole shapes extending in the vehicle width direction are formed below the opening 61A1. Also, a pair of left and right openings 61A3 with quadrangular shape are formed below the fan accommodating portions 61B.

The radiator shroud 60 is fastened, at the upper end portion, to the radiator 39 with fastening portions 61G on the outer sides of the opening 61A1 in the vehicle width direction. Also, the radiator shroud 60 is fastened, at the lower end portion, to fastening portions 61H on the sides of outer ends in the vehicle width direction. The fastening at the fastening portions 61G and 61H is achieved by fastening members 69 extending in the front-rear direction. The fastening members 69 are, for example, bolts.

As illustrated in FIG. 6, the hose connecting portion 39B1 is exposed on the left side of the upper wall portion 63 of the radiator shroud 60. Also, the radiator cap 53 is exposed on the right side of the upper wall portion 63. A pair of left and right flange portions (connecting pieces) 63A on the upper side are formed in the upper wall portion 63 in a manner corresponding to the center portion in the vehicle width direction.

The flange portions 63A on the upper side include securing portions 63B with plate shapes projecting on the upper side from the upper surface of the upper wall portion 63 and reinforcing portions 63C extending on outer sides in the vehicle width direction from both front and rear ends of the securing portions 63B and connected to the upper surface of the upper wall portion 63. The flange portions 63A have substantially U shapes in a plan view.

The securing portions 63B of the flange portions 63A are formed in the proximity of the fastening portions 61G on the upper side in the vehicle width direction and are formed on the outer sides in the vehicle width direction beyond the fastening portions 61G.

The flange portions 63A are rubber-mounted in upper stays (stays, securing portions) 100 of the down frame 19c as illustrated in FIG. 5. A pair of left and right upper stays 100 are provided and secured to the down frame 19c. Each upper stay 100 includes an extending portion 101 extending on an outer side in the vehicle width direction from a side surface of the down frame 19c in the vehicle width direction, a securing portion 102 bent on the front side at an outer end of the extending portion 101 in the vehicle width direction, and a fastening hole portion 103 formed at the securing portion 102.

Rubbers 105 and 106 with annular shapes are disposed on both surfaces of the securing portions 63B of the flange portions 63A in the vehicle width direction. Also, bolts 108 are inserted from outer sides in the vehicle width direction in a state in which the securing portions 63B and the rubbers 105 and 106 are sandwiched with the securing portions 102 of the upper stays 100 and washers 107. Moreover, inner ends of the bolts 108 in the vehicle width direction are fastened to the fastening hole portions 103 of the upper stays 100. In this manner, the flange portions 63A on the upper side are connected to the upper stays 100 via the rubbers 105 and 106, and the rubber-mounting is achieved. At this time, the rubbers 106 are disposed on the outer sides of the securing portions 63B of the flange portions 63A in the vehicle width direction and are disposed between the reinforcing portions 63C on the front side and the reinforcing portions 63C on the rear side.

As illustrated in FIG. 7, a flange portion (connecting piece) 64A on the lower side is formed in the lower wall portion 64 of the radiator shroud 60. The flange portion 64A on the lower side is configured similarly to the flange portions 63A on the upper side. In other words, the flange portion 64A on the lower side includes a securing portion 64B with a plate shape extending slightly on the rear lower side along inclination of the down frame 19c from the lower surface of the lower wall portion 64 and reinforcing portions 64C extending on outer sides in the vehicle width direction from both front and rear ends of the securing portion 64B and connected to the lower surface of the lower wall portion 64. The flange portion 64A has a substantially U shape in a bottom view.

The securing portion 64B of the flange portion 64A is located on the outer side in the vehicle width direction beyond the center of the down frame 19c in the width direction.

The flange portion 64A on the lower side is rubber-mounted on the lower stay 110 of the down frame 19c as illustrated in FIG. 5. One lower stay 110 is provided and secured to the center portion of the down frame 19c in the width direction. The lower stay 110 is bent in an L shape. The lower stay 110 includes a securing portion 111 with a plate shape secured to the front surface of the down frame 19c, an extending portion 112 extending while bent on the front side from the outer end of the securing portion 111 in the vehicle width direction, and a fastening hole portion 113 formed at a distal end of the extending portion 112.

The flange portion 64A on the lower side is also rubber-mounted similarly to the flange portions 63A on the upper side. In other words, rubbers 105 and 106 are disposed on both surfaces of the securing portion 64B of the flange portion 64A in the vehicle width direction, and the bolt 108 is inserted from the outer side in the vehicle width direction in a state in which the securing portion 64B and the rubbers 105 and 106 are sandwiched by the extending portion 112 of the lower stay 110 and the washer 107 in the vehicle width direction. Also, an inner end of the bolt 108 in the vehicle width direction is fastened to the fastening hole portion 113 of the lower stay 110. In this manner, the flange portion 64A on the lower side is connected to the lower stay 110 via the rubbers 105 and 106, and the rubber mounting is achieved. At this time, the rubber 106 is disposed on the outer side of the securing portion 64B of the flange portion 64A in the vehicle width direction and is disposed between the reinforcing portion 64C on the front side and the reinforcing portion 64C on the rear side.

The radiator 39 is supported by the vehicle body frame 11 via the radiator shroud 60. It is thus possible to achieve securing at a position at which rigidity is easily achieved, via the upper stays 100, the lower stay 110, and the like from the vehicle body frame 11 merely by changing the shape of the radiator shroud 60. It is thus possible to achieve connection to an appropriate position of the vehicle body frame 11 with the intervention of the radiator shroud 60 in the present embodiment irrespective of the attachment position on the side of the radiator 39, and a degree of freedom in designing the support structure of the radiator 39 thus increases.

Figure 9:
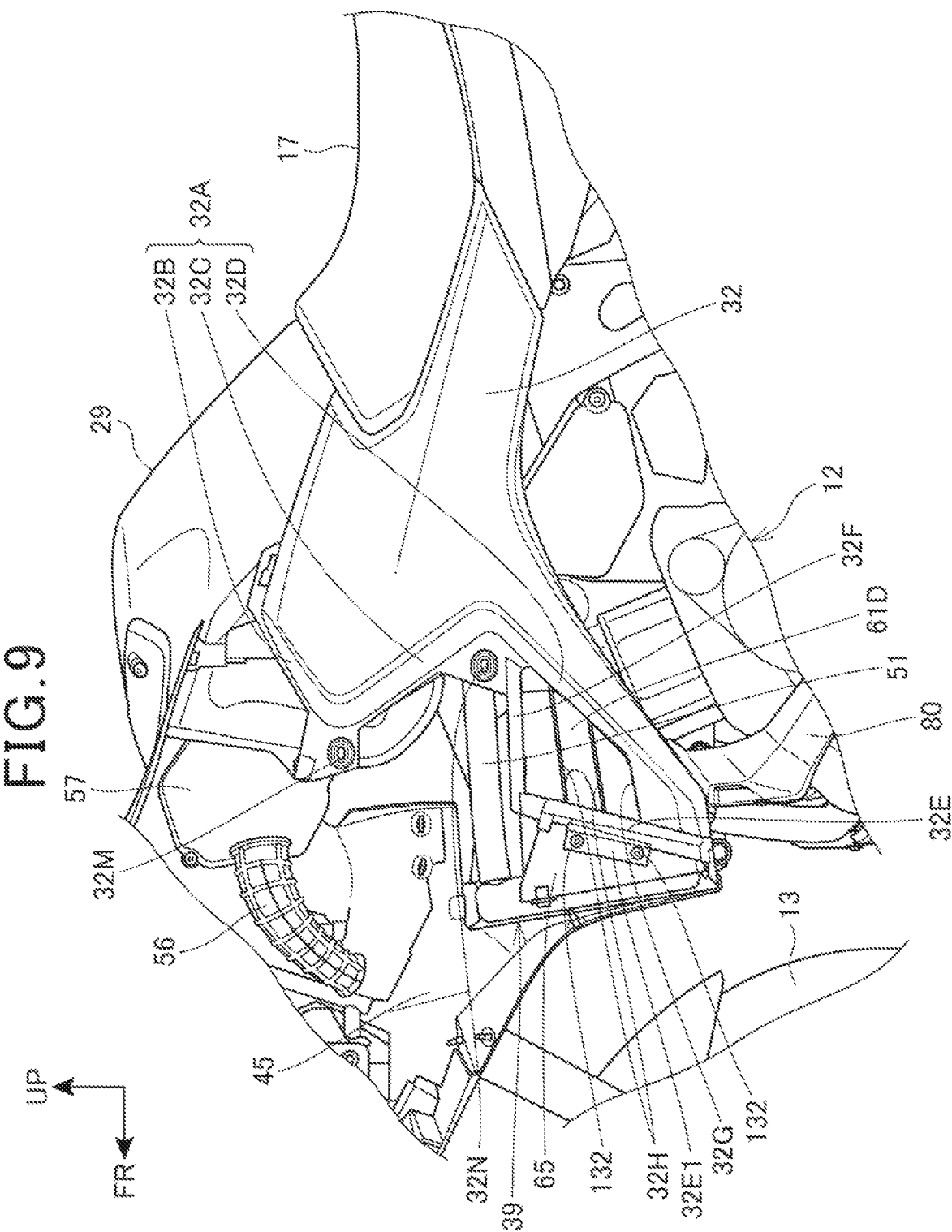
FIG. 9 is a left side view of the saddle-ride vehicle in a case in which a connection cover is omitted from FIG. 4.

FIG. 9 is a left side view of the saddle-ride vehicle 10 in a case in which the connection cover 46 is omitted from FIG. 4. FIG. 10 is a diagram in which illustration of the side covers 32 is omitted from FIG. 9.

As illustrated in FIG. 10, the side wall portion 65 of the radiator shroud 60 on the left side has a triangular plate shape with a width narrowed in the up-down direction toward the rear side in a side view. The side wall portion 65 covers the side surface of the radiator 39 from the outer side in the vehicle width direction. The side wall portion 65 is separated from the discharged wind guide portions 61D on the inner side in the vehicle width direction, and wind discharged from the radiator fans 67 can pass between the side wall portion 65 and the discharged wind guide portions 61D. The discharged wind is guided to the outer sides in the vehicle width direction by the discharged wind guide portion 61D and is then discharged from the wind discharge ports 61E.

A cover engagement hole 65A penetrating in the thickness direction is formed at the rear part of the side wall portion 65. The cover engagement hole 65A extends in the up-down direction. Cover securing holes 65B are formed on the upper and lower sides of the cover engagement hole 65A. The side cover 32 is engaged with the cover engagement hole 65A.

The side wall portion 66 on the right side is formed similarly to the side wall portion 65 on the left side. A cover engagement hole 66A and cover securing holes 66B are also formed in the side wall portion 66 on the right side in a manner corresponding to the cover engagement hole 65A and the cover securing holes 65B of the side wall portion 65 on the left side (see FIG. 8).

As illustrated in FIG. 9, the side covers 32 extend from the seat 17 to the front side.

The left and right side covers 32 cover the fuel tank 29 and a portion below the front portion of the seat 17 from the sides. Projecting portions 32A extending in substantially S shapes in a side view are formed at front end portions of the side covers. Each projecting portion 32A includes an upper portion 32B extending downward on the front side from the upper end, an intermediate portion 32C extending downward on the rear side from the lower end of the upper portion 32B, and an extending portion 32D extending downward on the front side from the lower end of the intermediate portion 32C. The lower end of the intermediate portion 32C extends up to the position of the radiator hose 51 in a side view. The extending portion 32D extends along the rear side of the radiator shroud 60 of the radiator 39.

A first connecting portion 32E extending on the upper side is formed at the front end of the extending portion 32D. The first connecting portion 32E includes an engagement portion 32E1 with a plate shape. An engagement portion main body (not illustrated) projecting on the inner side in the vehicle width direction is formed on the inner surface of the engagement portion 32E1 in the vehicle width direction. The engagement portion main body is engaged with the cover engagement holes 65A and 66A (see FIG. 8) of the side wall portion 65 and 66 of the radiator shroud 60, and the upper and lower sides of the engagement portion 32E1 (the engagement portion 32E1 on the right side is not illustrated) are secured and connected to the cover securing holes 65B and 66B (see FIG. 8) of the radiator shroud 60 with securing tools 132.

The side covers 32 are also engaged with engagement portions 29A and 29B (see FIG. 10) of the fuel tank 29.

Also, the side cover 32 on the left side is also engaged with a cover engagement portion 82C (see FIG. 10) provided at an upper end of a foot defector 80 on the left side supported by the undercover 33.

The left and right side covers 32 are supported by the vehicle body frame 11 via the radiator shroud 60, the fuel tank 29, and the like.

A second connecting portion 32F connecting the upper end of the first connecting portion 32E and the upper end of the extending portion 32D is formed at the upper end of the first connecting portion 32E. An opening shape surrounded by the first connecting portion 32E, the second connecting portion 32F, and the extending portion 32D forms a cover wind discharge portion 32G. A plurality of louver portions 32H extending in the front-back direction are provided between the first connecting portion 32E and the extending portion 32D across the cover wind discharge portion 32G.

The cover wind discharge portion 32G overlaps the discharged wind guide portion 61D (see FIG. 9) of the radiator 39 in a side view. The wind discharged from the radiator 39 through the wind discharge port 61E of the discharged wind guide portion 61D is discharged to the outside of the vehicle body cover 30 through the cover wind discharge portion 32G.

Engagement portions 32M and 32N are formed in the side covers 32. The front side cowls 43 (see FIG. 3) are engaged with the engagement portions 32M and 32N.

The front side cowls 43 are connected to the side covers 32 along the upper portions 32B of the projecting portions 32A, the intermediate portions 32C as illustrated in FIG. 3, and the second connecting portions 32F (see FIG. 10). The front side cowls 43 cover an air cleaner box 56 and a pair of left and right intake ducts 57 extending on the lower side from the air cleaner box 56.

Also, the front side cowls 54 are connected to upper edges of the front lower cowls 44. The front lower cowls 44 cover the front sides of the first connecting portions 32E of the side covers 32.

The vehicle body cover 30 forms an opening for the cover wind discharge portion 32G with a shape surrounded by the front side cowls 43, the front lower cowls 44, and the extending portions 32D of the projecting portions 32A of the side covers 32.

The projecting portions 32A include parts projecting in the vehicle width direction beyond the front side cowls 43 such that wind discharged from the cover wind discharge portions 32G is easily guided by the projecting portions 32A.

As described above, according to the present embodiment to which the invention is applied, the saddle-ride vehicle 10 in which the radiator 39 is disposed in front of the down frame 19c hanging down from the head pipe 18 includes the radiator shroud 60 provided at the radiator 39, and the radiator 39 is supported only by the radiator shroud 60 and is supported by the vehicle body constituted by the vehicle body frame 11, the power unit 12, and the like via the radiator shroud 60. It is thus possible to support the radiator 39 at a position at which rigidity is easily achieved regardless of the form of the vehicle body frame 11 and to improve a degree of freedom in attachment of the radiator 39.

In the present embodiment, the radiator shroud 60 is secured to the side covers 32 of the vehicle body cover 30 and the vehicle body frame (frame) 11. It is thus possible to support the radiator 39 at a position at which rigidity is easily achieved, namely at the side covers 32 and the vehicle body frame 11, via the radiator shroud 60.

Also, in the present embodiment, the radiator shroud 60 includes the rear wall portion 61 covering the rear surface of the radiator 39 and is connected to the radiator 39 with the fastening portions 61G and 61H of the rear wall portion 61. It is thus possible to connect the radiator 39 to the radiator shroud 60 on the rear surface of the radiator 39, which is likely to be a large surface, and to facilitate stable support of the radiator 39 with the radiator shroud 60.

Also, in the present embodiment, the radiator shroud 60 includes the side wall portions 65 and 66 covering the side surfaces of the radiator 39 and is connected to the side covers 32 at the side wall portions 65 and 66. It is thus possible to secure the radiator shroud 60 to the vehicle body cover 30 at positions on the outer sides in the vehicle width direction and to facilitate support of the radiator 39 with rigidity.

Also, in the present embodiment, the radiator shroud 60 includes the upper wall portion 63 covering the upper surface of the radiator 39 and the lower wall portion 64 covering the lower surface of the radiator 39, and the upper wall portion 63 and the lower wall portion 64 are provided with the flange portions 63A and 64A connected to the vehicle body frame 11, respectively, and the flange portions 63A and 64A are connected to the vehicle body frame 11. It is thus possible to connect the radiator shroud 60 to the vehicle body frame 11 on the upper and lower sides and to facilitate support of the radiator 39 with rigidity.

Also, in the present embodiment, the securing portions on the upper side of the radiator 39 provided at the down frame 19c are the pair of left and right upper stays 100, and the upper stays 100 are connected to the flange portions 63A provided at the upper wall portion 63 of the radiator shroud 60 at positions extending in the vehicle width direction. It is thus possible to secure the radiator shroud 60 to the vehicle body frame 11 at the positions on the outer sides in the vehicle width direction and to facilitate support of the radiator 39 with rigidity.

Other Embodiments

The aforementioned embodiment illustrates only an aspect of the invention, and arbitrary modifications and applications can be made without departing from the gist of the invention.

Although the configuration in which one down frame 19c is provided has been described in the above embodiment, a configuration in which a pair of left and right down frames are provided may be employed, or a configuration in which two down frames hang down from the head pipe 18 may also be employed.

Although the configuration in which the side covers 32 are connected to the side wall portions 65 and 66 has been described in the aforementioned embodiment, a configuration in which the front side cowls 43, for example, allow the connection instead of the side covers 32 may be employed, or an arbitrary vehicle body cover 30 may be connected to the side wall portions 65 and 66.

Although a motorcycle including the front wheel 13 and the rear wheel 15 has been described as an example of the saddle-ride vehicle 10 in the aforementioned embodiment, the invention is not limited thereto, and the invention can be applied to a three-wheeled saddle-ride vehicle including two front wheels or rear wheels or a saddle-ride vehicle including four or more wheels.

[Configurations Supported by Aforementioned Embodiment]

The aforementioned embodiment supports the following configuration.

(Configuration 1) A saddle-ride vehicle in which a radiator is disposed in front of a down tube hanging down from a head pipe, the saddle-ride vehicle including: a radiator shroud provided at the radiator, the radiator being supported only by the radiator shroud, the radiator being supported by a vehicle body via the radiator shroud.

With this configuration, it is possible to support the radiator at a position at which rigidity is easily achieved regardless of a frame form and to improve a degree of freedom in attachment of the radiator.

(Configuration 2) The saddle-ride vehicle according to Configuration 1, in which the radiator shroud is secured to a vehicle body cover and a frame.

With this configuration, it is possible to support the radiator at a position at which rigidity is easily achieved, namely at the vehicle body cover and the frame, via the radiator shroud.

(Configuration 3) The saddle-ride vehicle according to Configuration 1 or 2, in which the radiator shroud includes a rear wall portion covering a rear surface of the radiator and is connected to the radiator at the rear wall portion.

With this configuration, it is possible to connect the radiator to the radiator shroud on the rear surface of the radiator, which is likely to be a large surface, and to facilitate stable support of the radiator with the radiator shroud.

(Configuration 4) The saddle-ride vehicle according to any one of Configurations 1 to 3, in which the radiator shroud includes side wall portions covering side surfaces of the radiator and is connected to a vehicle body cover at the side wall portions.

With this configuration, it is possible to secure the radiator shroud to the vehicle body cover at the positions on the outer sides in the vehicle width direction and to facilitate support of the radiator with rigidity.

(Configuration 5) The saddle-ride vehicle according to any one of Configurations 1 to 4, in which the radiator shroud includes an upper wall portion covering an upper surface of the radiator and a lower wall portion covering a lower surface of the radiator, the upper wall portion and the lower wall portion being provided with flange portions connected to the frame, respectively, the flange portions being connected to the frame.

With this configuration, it is possible to connect the radiator shroud to the frame on the upper and lower sides and to facilitate support of the radiator with rigidity.

(Configuration 6) The saddle-ride vehicle according to Configuration 5, in which a securing portion provided at the down tube above the radiator is a pair of stays, and the stays are connected to the flange portions provided at the upper wall portion of the radiator shroud at positions extending in a vehicle width direction.

With this configuration, it is possible to secure the radiator shroud to the frame at positions on the outer sides in the vehicle width direction and to facilitate support of the radiator with rigidity.

REFERENCE SIGNS LIST 10 saddle-ride vehicle
11 vehicle body frame (frame, vehicle body)
12 engine (power unit, vehicle body)
18 head pipe
19c down frame (down tube)
32 side cover (vehicle body cover)
39 radiator
60 radiator shroud
61 rear wall portion
65, 66 side wall portion
63 upper wall portion
64 lower wall portion
63A, 64A flange portion
100 upper stay (stay)

What is claimed is:

1. A saddle-ride vehicle comprising: a single down tube hanging down a front side of a power unit from a head pipe; and a side cover covering a lateral side portion of a vehicle body, wherein a radiator is disposed in front of the down tube, the saddle-ride vehicle comprises:
a radiator shroud provided at the radiator,
the radiator shroud includes an outer peripheral wall covering an outer periphery of the radiator,
the radiator is supported only by the radiator shroud,
the outer peripheral wall of the radiator shroud includes a securing portion supported by the down tube at a vehicle width center portion, and a cover securing portion supported by the side cover at a vehicle width outer side.

2. The saddle-ride vehicle according to claim 1, wherein the radiator shroud is secured to a vehicle body cover and the down tube.

3. The saddle-ride vehicle according to claim 1, wherein the radiator shroud includes a rear wall portion covering a rear surface of the radiator and is connected to the radiator at the rear wall portion.

4. The saddle-ride vehicle according to claim 1, wherein the radiator shroud includes side wall portions covering side surfaces of the radiator and is connected to the vehicle body cover at the side wall portions.

5. The saddle-ride vehicle according to claim 2, wherein the radiator shroud includes an upper wall portion covering an upper surface of the radiator and a lower wall portion covering a lower surface of the radiator, the upper wall portion and the lower wall portion being provided with flange portions that are connected to the down tube.

6. The saddle-ride vehicle according to claim 5, wherein the securing portion provided at the down tube above the radiator is a pair of stays that are connected to the flange portions provided at the upper wall portion of the radiator shroud at positions extending in a vehicle width direction.

* * * * *